United States Patent [19]

Ansteensen

[11] Patent Number: 5,448,961
[45] Date of Patent: Sep. 12, 1995

[54] USER SUPPORTED PORTABLE SAIL

[76] Inventor: Erik Ansteensen, 500 SE. 4th Ct., Pompano, Fla. 33060

[21] Appl. No.: 912,298

[22] Filed: Jul. 13, 1992

[51] Int. Cl.⁶ .................................. B63H 9/04
[52] U.S. Cl. .......................... 114/89; 114/102
[58] Field of Search .............. 114/39.1, 39.2, 102, 114/103, 90, 97–99, 89; 441/74, 79

[56] References Cited

U.S. PATENT DOCUMENTS

| | | | |
|---|---|---|---|
| 4,382,417 | 5/1983 | Talve | 114/39.2 |
| 4,533,159 | 8/1985 | Seidel | 114/39.2 |
| 4,649,848 | 3/1987 | Belvedere | 114/39.2 |
| 4,669,407 | 6/1987 | Cobb | 114/39.2 |
| 4,978,140 | 12/1990 | Babson | 114/39.2 |

Primary Examiner—Joseph F. Peters, Jr.
Assistant Examiner—Stephen P. Avila

[57] ABSTRACT

This is a user supported portable sail used to provide wind powered momentum for an individual on a moveable base. The invention involves the use of a balanced aerodynamic sail with the airfoil planes constructed in a way that allows the device to be used in more than one attitude. The invention also includes the use of clear panels for visibility, and the use of collapsable sections to render the device to a small portable and storable size. The support structure is provided with the means to allow it to be braced or stepped against a base and the shape itself is made to be infinitely and finely variable by the use of adjustable lines attached to the material and to the frame.

1 Claim, 1 Drawing Sheet

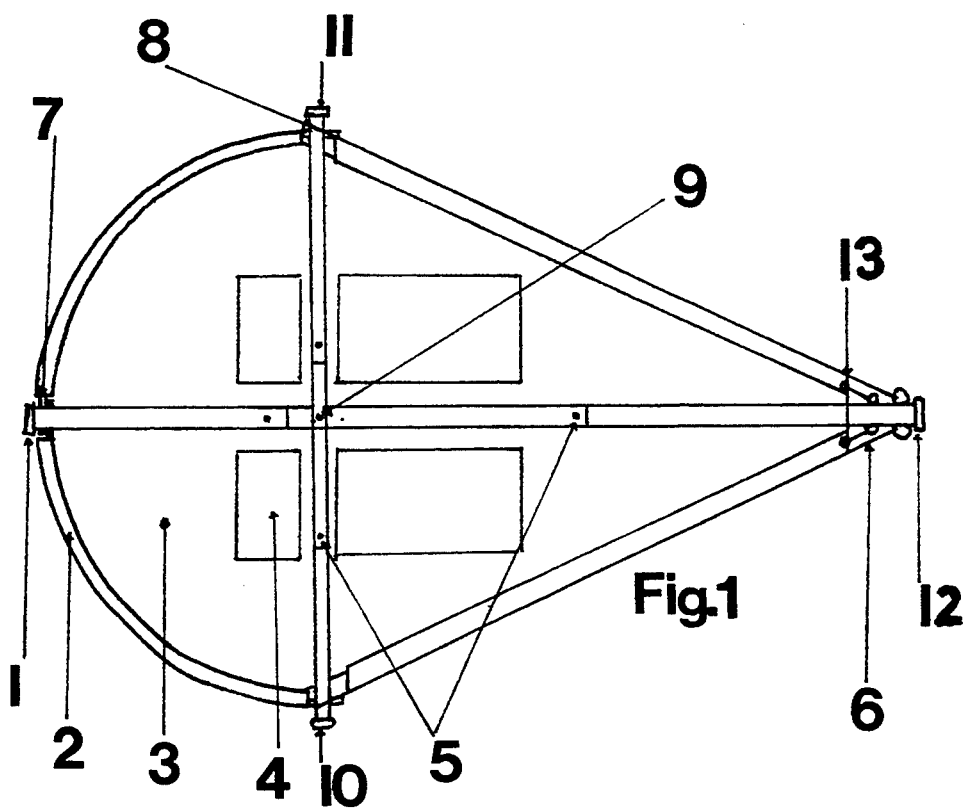
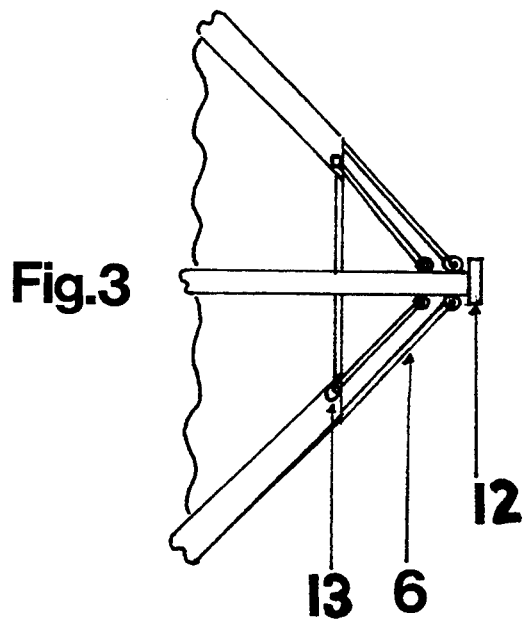

USER SUPPORTED PORTABLE SAIL

BACKGROUND OF THE INVENTION a. Field of the Invention

The present invention relates in general to a device used to provide wind powered propulsion. More specifically, the present invention relates to a device used as a portable and easily stored accessory to the sport of in line skating. (In line skating is practiced on the relatively new roller skate designed with wheels aligned on a blade rather than on traditional side by side trucks.)

b. Description of Related Art

In sport recreation, there is a continuing search for ways to add dimensions to particular disciplines. The merging of the sports of surfing and sailing and the birth of the whole new sport called windsurfing is a good example of what can happen. Some proposals have been made for adding propulsion by wind to other means of transportation.

In order that the present invention may be understood and appreciated in it's proper context, reference is made to the following related art.

U.S. Pat. No. 3,924,870 Spivack
U.S. Pat. No. 4,269,133 Brown
U.S. Pat. No. 4,473,022 Eastland
U.S. Pat. No. 4,651,665 Drake & Stanciu
U.S. Pat. No. Des. 267,867 Marsden Whatever the features and contained merits of the cited references, none achieves or fulfills the objectives of the present invention. None of the references provides for convenient collapsability. None of the references provides a means to step or brace the device to a temporary base of support should conditions demand it. None provides a means to infinitely adjust the aerodynamic shape of the device. None provides a means for the device to be used in four different positions. None provides for easy visibility through the device and none of the references would be called a "balanced" sail by those versed in similar art. A "balanced" sail is one which provides for equal or close to equal wind pressure to be felt fore and aft of a central pivot point.

SUMMARY OF THE INVENTION

The object of the present invention is to provide a means of wind propulsion by use of a balanced sail which can be collapsed to an easily portable and storable size, is provided with clear areas for vision through the device and which is infinitely adjustable for variations in wind velocity. A further object of the present invention is to provide said sail shape with a means to be stepped or braced on a support base and a means to use the device in more than one position.

The present invention includes a sail shape with clear areas for visibility, which shape is defined and supported by collapsable tubular mast sections which intersect to form a vertical and horizontal axis. It further includes the use of flexible and collapsable battens to support the curved part of the shape, cords to support the straight edges of the shape and cords, fastened to the main body of the shape, and which can be changed in the tension which is applied by them to the shape. Also included are end pieces for the mast sections which are of a rough material which allows the ends to be braced, by friction, temporarily against or on a base.

BRIEF DESCRIPTION OF THE DRAWING

FIG. 1. Illustrates the preferred shape of the invention with the positions of the key elements.

FIG. 2. Illustrates the passage of the flexible battens through the sleeve in the sail shape and through the mast end with bushing.

FIG. 3. Illustrates the point of fastening for the cord which supports the straight sides of the shape and the relative position and attachment means of the adjustable cords.

DESCRIPTION OF THE PREFERRED EMBODIMENT

The preferred embodiment of the present invention will now be described in connection with FIGS. 1,2,3.

The sail shape #3, is made of a durable lightweight windproof material such as dacron or similar material and sewn in a single or multi panel design with clear panels #4 provided to enhance visibility for the user. The curved parts of the shape #2 are supported by flexible battens constructed with splice tubes to allow them to be separated into smaller pieces for easy storage or transport. The battens pass through the mast sections #7 & 8 for further support and through the sail shape in sewn sleeves. The holes in the mast sections which receive the batten ends are bushed with a durable tubing material such as aluminum. The mast sections are tubes of lightweight rigid and durable material, in the preferred embodiment fiberglass and carbon fiber. The mast tubes are built with #5 splice sections to allow them to be separated into smaller pieces for storage and transport. The two main mast sections are held together at their point of intersection #9 by a removeable pin made of a durable material. The removeable pin uses a snap ring or key to hold it in place. The ends of the assembled mast sections #1, 10, 11, & 12 are provided with a cap with a rough end to aid in holding the end by friction if it is stepped or braced temporarily on a support or base. The straight edge sections of the shape are supported by a fixed cord #6 fastened at the ends of the shorter mast section and at the end of the long mast section furthest from the point of intersection. Additional cords #13 are fastened to the sail body and can be adjusted at a point on the long mast section to apply more or less tension on the aerodynamic shape.

The preferred embodiment of the present invention has been described herein and such embodiment is provided by way of example only. Changes and variations may occur to those versed in similar art and it is intended that the present invention be limited only by the scope and spirit of the attached claims.

What is claimed is;

1. A user supported portable airfoil sail assembly comprising:
   a. two rigid tubular sections of unequal length with each section being made up of mutiple shorter sections which are joined together to make the whole and are joinable by sleeved joints;
   b. means for attaching the two tubular sections to each other at right angles at a point one third of the length of the longer section and one half of the length of the shorter section;
   c. two flexible rod sections of equal length with each section being made up of multiple shorter sections which are joined together to make the whole and are joinable by sleeved joints;

d. means to allow the flexible rod sections to pass through the ends of the rigid tubular sections, both rod sections passing through the tubular end closest to the intersection of the two tubular sections and each seperately through each end of the shortest tubular section;

e. a sail which is shaped with one end being a half circle which in turn intersects, at each end, with a straight edge which is angled to intersect the opposite straight edge at a point which is roughly three times the diameter of the half circle edge and, which intersection forms an acute angle of approximately sixty degrees;

f. a sleeve sewn into the entire edge of the shape with openings at each end of the half circle edge, where it intersects with the straight edges, and half way along the arc of the half circle edge and at the end of each straight edge nearest the acute angle formed by their intersection;

g. said sleeves being of sufficient size, on the arc of the half circle edge, to accept the flexible rod sections and, on the straight edges, to contain a length of cord which is permanently inserted and extends at each opening in the sleeve;

h. each cord, in the sleeve of the straight edge, being attachable to each end of the shortest tubular section and to the end of the longest tubular section furthest away from the point of intersection of the two sections;

i. with the cords so attached to the said ends of the tubular sections and the flexible rod sections inserted through the sleeve on the curved end of the shape and passing through the ends of the tubular sections, as mentioned, the assembly as a whole becomes a unit with the sail shape supported only as to its shape definition by the framework so provided.

* * * * *